J. R. KOONS.
EARTH CLOSET.
APPLICATION FILED APR. 25, 1907.

912,856.

Patented Feb. 16, 1909.
6 SHEETS—SHEET 1.

WITNESSES:

INVENTOR:
John R. Koons,
By
Attorney

J. R. KOONS.
EARTH CLOSET.
APPLICATION FILED APR. 25, 1907.
912,856.
Patented Feb. 16, 1909.
6 SHEETS—SHEET 2.
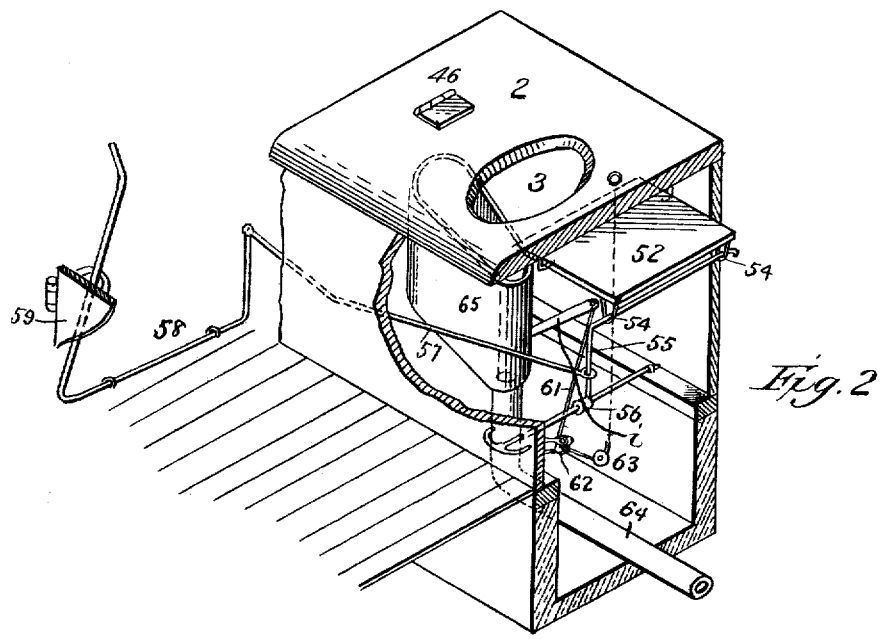
Fig. 2
Fig. 6.
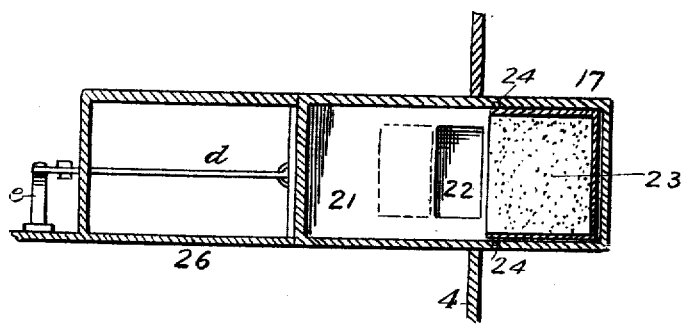
WITNESSES.
INVENTOR:
John R. Koons,
By
Attorneys

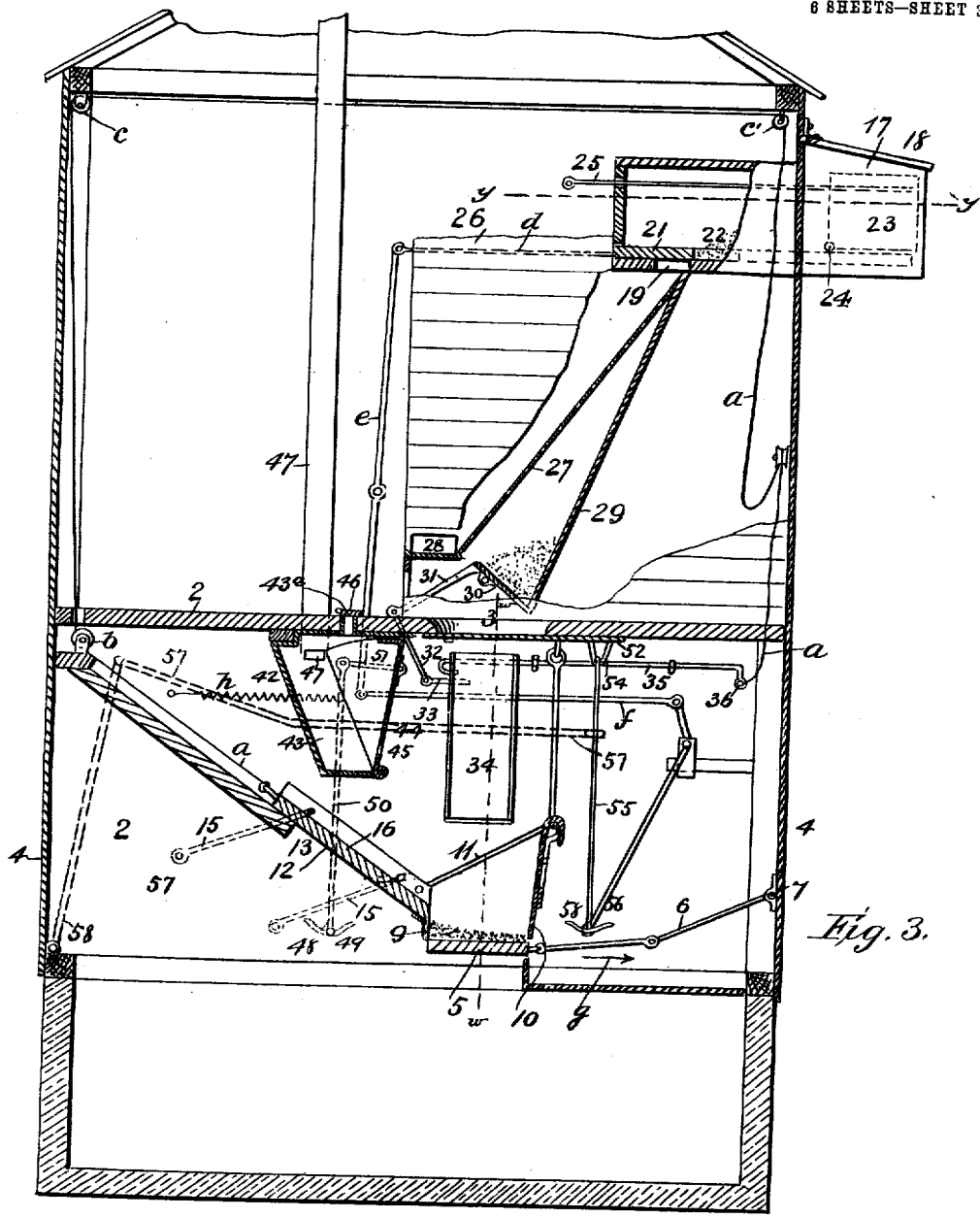

J. R. KOONS.
EARTH CLOSET.
APPLICATION FILED APR. 25, 1907.

912,856.

Patented Feb. 16, 1909.
6 SHEETS—SHEET 4.

Witnesses:

Inventor:
John R. Koons,
By
Attorneys

J. R. KOONS.
EARTH CLOSET.
APPLICATION FILED APR. 25, 1907.

912,856.

Patented Feb. 16, 1909.
6 SHEETS—SHEET 5.

WITNESSES:

INVENTOR:
John R. Koons,
By
Attorneys

J. R. KOONS.
EARTH CLOSET.
APPLICATION FILED APR. 25, 1907.
912,856.
Patented Feb. 16, 1909.
6 SHEETS—SHEET 6.
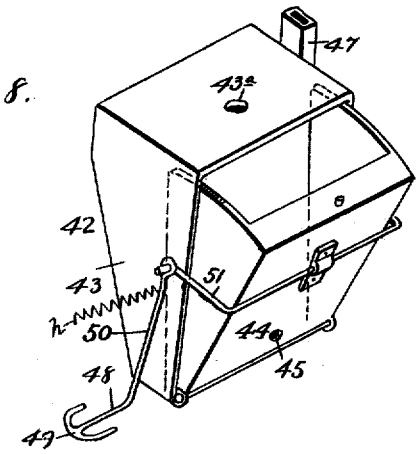
Fig. 8.
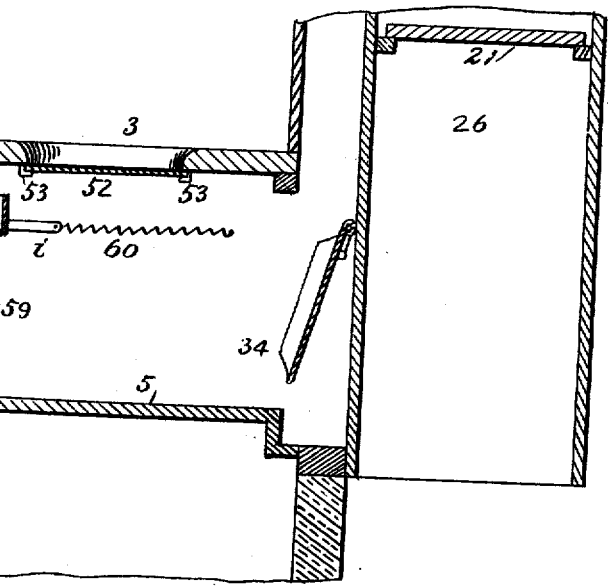
Fig. 10.
Witnesses:
Inventor:
John R. Koons,
By
Attorneys

UNITED STATES PATENT OFFICE.

JOHN R. KOONS, OF HUNTINGTON MILLS, PENNSYLVANIA.

EARTH-CLOSET.

No. 912,856.   Specification of Letters Patent.   Patented Feb. 16, 1909.

Application filed April 25, 1907. Serial No. 370,274.

*To all whom it may concern:*

Be it known that I, JOHN R. KOONS, a citizen of the United States, residing at Huntington Mills, in the county of Luzerne and State of Pennsylvania, have invented certain new and useful Improvements in Earth-Closets, of which the following is a specification.

My invention relates to improvements in earth closets or privies.

Its objects are to provide for readily suppressing odors and to promote hygienic conditions generally in this class of contrivances as will be subsequently made apparent.

Said invention consists of certain features or instrumentalities substantially as hereinafter fully disclosed and specifically pointed out by the claims.

Figure 1:
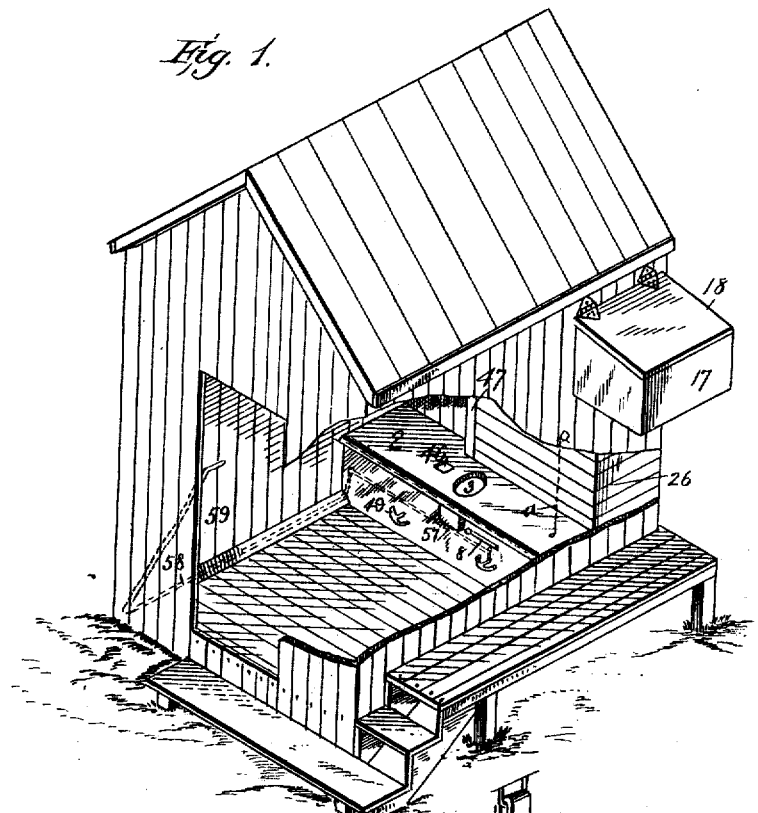
Figure 9:
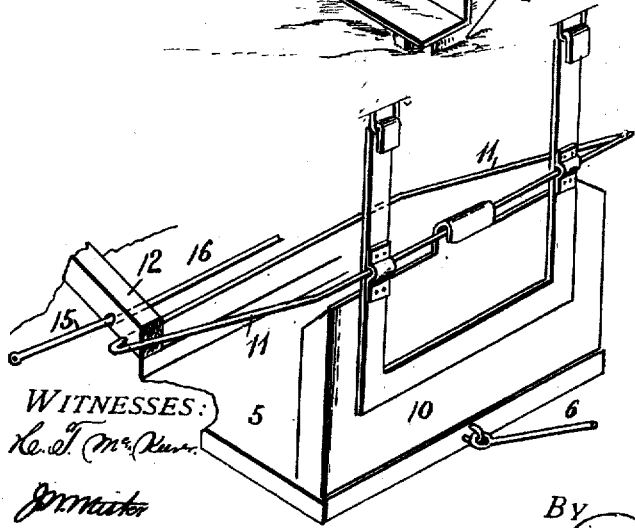
Figure 4:
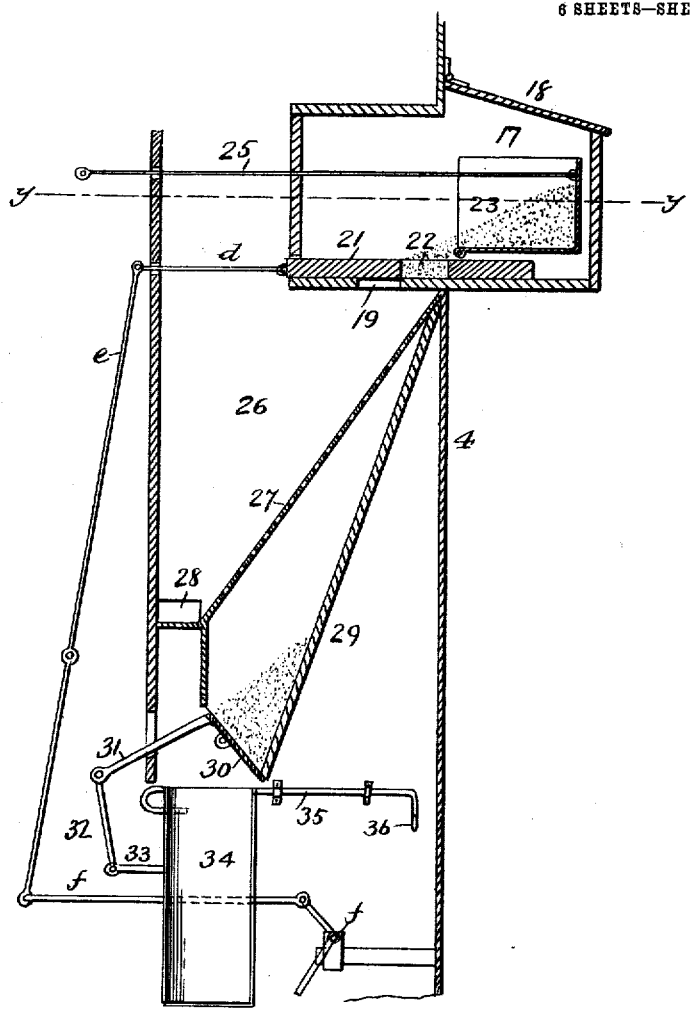
Figure 7:
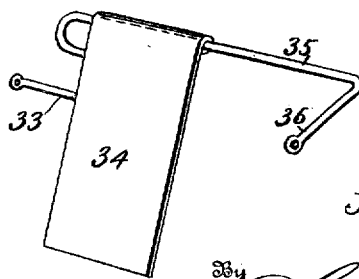
Figure 5:
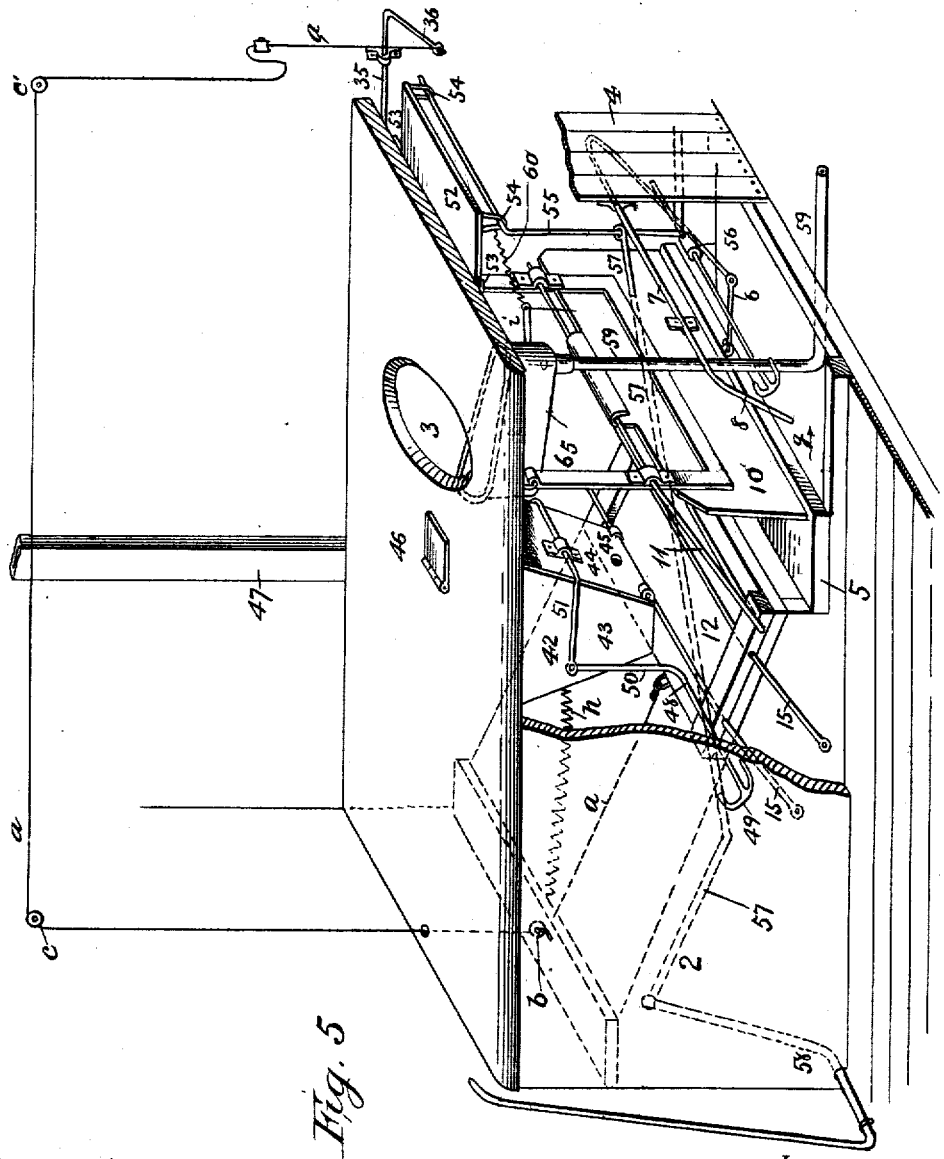

In the accompanying drawings illustrating
the preferred embodiment of my invention—
Figure 1 is a broken perspective view thereof. Fig. 2 is a broken enlarged like view showing more particularly the details of the urinal. Fig. 3 is a vertical longitudinal section taken through Fig. 1. Fig. 4 is a vertical section. Fig. 5 is a broken perspective view showing more especially the closure for the seat-opening and its actuating means. Fig. 6 is a horizontal section taken on the line y—y of Fig. 4. Fig. 7 is an enlarged separate view more particularly of the delivery contrivance or "flipper." Fig. 8 is a corresponding view of the toilet paper crematory. Fig. 9 is a like view of the "push off" or scraper for removing the excrement and superposed ash-layer. Fig. 10 is a vertical transverse section.

In carrying out my invention, I make a suitable excavation or pit (not shown) in practice suitably cemented, primarily for the reception of the excrement, and over this pit is located a receptacle or box 2 provided with the usual seat-opening or orifice 3, and which, of course, is suitably inclosed or housed-in, as well understood, the inclosure or housing being designated as 4.

A shelf or board 5 is arranged a suitable distance downward from, and in alinement with the seat-opening or orifice 3 and is suitably supported and guided in its movement, when actuated as presently disclosed, and which shelf or board intercepts the excrement for its treatment before being delivered finally into the pit below as next described.
Said shelf or board has attached to it a jointed sectional lever or rod-connection 6 which has an integral lateral extension 7 suitably fulcrumed upon the inclosure or housing 4, and which extension has a right-angled arm or lever 8 by the suitable manipulation of which by the closet-occupant said shelf or board 5 may be actuated for delivering the final layer of material resting upon the latter from the box-chamber into the pit below.

An upstanding plate or guard 9 with its ends secured to the front and back walls of the box 2, is arranged just at the upper forward edge of the board or shelf 5; and just opposite said plate or guard is suitably hung or pivoted a "push-off" or scraper 10, with its effective edge standing slightly above the upper rear edge of said shelf or board 5. The upper edge of said scraper 10 has fixed to it the connecting member of parallel arms of a bail-like lever or link 11; and arranged in a slightly upward and laterally inclined position, is a second movable board 12 serving as a closure for the delivery-opening 13 in the receptacle-bottom, through which is pushed by the scraper 10 as presently noted the top or upper portion of the material, comprising the excrement and a superposed ash - layer deposited upon the latter as also subsequently disclosed. Said closure 12 is suitably supported and pivoted in position, in order to allow of uncovering the opening 13, upon rod-links 15 pivotally connected to the housing or inclosure 4 and preferably to upstanding lateral plates 16 secured to said closure 12. Said closure is conveniently actuated among other ways, by the use of a line a, having one end connected to one of the plates 16 of said closure, said line being passed, for proper guidance, under a pulley b, suitably supported in position, and upward out through the top or seat portion of the box 2 and over suitably spaced apart elevated pulleys c, c', it being finally passed downward and hanging in a slack or limp condition and rendered also effective for actuating what may be termed a chute as hereinafter pointed out. The link or lever 11 for directly actuating the "push-off" or scraper 10, has its arms connected to the closure or board 12 for the synchronous actuation of said "push-off" or scraper with, and by the actuation of said closure or board 12, by suitably pulling upon the line a. It will therefore be noted that, as the

"push-off" or scraper 10 is thus actuated, it will move in an arc directly over the shelf or board 5 and accordingly remove so much of the material deposited thereon as will be in the line of travel of said "push-off" or scraper, i. e. the excrement and the superposed layer of ashes; a layer or quantity of ashes previously or initially deposited upon said shelf or board, as later explained, underlying, and upon which said excrement &c., has been received, being retained as suggested by the space between the push-off-line of travel and said shelf or board for the suitable protection of the latter as will be readily appreciated.

Arranged at the rear of the inclosure or housing 4, in a relatively elevated position with one end let into said inclosure, is a receptacle 17 for receiving and delivering ashes as hereinafter disclosed, it being covered and having a hinged closure 18 for the opening through which the ashes are to be passed thereinto. Said receptacle has also an opening 19 in its bottom, well toward its end let into the housing or inclosure 2; and arranged within said receptacle is a slide or valve 21 having an opening 22, by the movement of which slide in the manner presently noted its opening may be brought into registration with said opening 19 when it may be required to deliver ashes therethrough, the ashes being deposited upon said slide as they are put into the receptacle 17. Said slide or valve 21 has fixed thereto a rod d extending out through an aperture in one side of the annex 26 and to said rod is connected the upper end of a centrally fulcrumed lever e, the lower end of the latter being connected to a suitably pivoted rock-shaft f extending out through the front board of the seat-box for the ready application of the foot to a stirrup-terminal thereof, and by the actuation of which said slide or valve may be readily operated as when it may be required to deliver ashes from the receptacle 17 as aforesaid. Also located within said receptacle is a supplementary receptacle 23 opening upward and at its forward end, and suitably pivoted, slightly above the bottom of the containing receptacle, at its forward bottom edge as at 24 to permit of its being tilted forward and dumping ashes which may be placed therein and when there may be none in the receptacle or hopper 17, or the contents of the latter may have become exhausted. The tilting receptacle 23, of course, delivers its contents upon the slide 21 and which are accordingly finally dropped through the opening 19 in the bottom of the receptacle 17 similarly as in directly disposing of the contents of the latter receptacle 17. Said tilting receptacle 23 is adapted to be tilted by manually actuating a suitably handled rod 25 connected to the inner surface of the rear side of said receptacle and extending through the forward end of the receptacle 17 and through one side of an annex 26 at that side of the housing or inclosure 2 for convenient grasping.

Arranged within the annex 26 is a downward and forward inclined screen 27, so disposed as to receive the ashes as they fall through the opening 19 of the receptacle 17 and, after the screening operation to deliver the lump portions of the ashes out through a rearward-delivering opening 28, the ashes being received upon, and delivered by an inclined board 29 upon a grate or closure 30 at the lower end of the latter. Said gate 30 comprises a downward and rearward or laterally inclined pivoted plate having fixed to its upper pivoted edge an oppositely inclined or deflected lever 31 in turn having articulated to its outer end a link 32 similarly connected to a rod 33 fixed to a chute 34, said chute also having fixed to its rear end, preferably upon its underside, an additional laterally extending rod 35, suitably fulcrumed in position, with its distant end provided with a crank-arm 36, having connected thereto the slack or limp portion of the line a for the actuation of said chute further disclosed later.

A hopper 42 consisting of a stationary section 43 suitably fixed within the seat-box 2, with its upper open end arranged directly under the seat, in alinement with an opening 43ª in the latter, and of a pivoted section 44, with a draft-opening 45 in its lower part, is designed to receive soiled toilet-paper for its incineration, as will be readily appreciated. The opening 43ª has a suitable closure 46, provided with a finger-receiving hole or orifice for its convenient removal and replacement. A suitable smoke-outlet 47 is provided in one side of the hopper, near its upper end. Said pivoted hopper section is automatically returned and retained in its closed position by a spring h suitably secured to said hopper section and the inclosure 2, when the pressure is removed from its actuating shaft 48. It will be noted that in the use of the pivoted hopper-section, it is adapted, when in its extended position to stand in alinement with the opening 3, whereby the soiled toilet-paper may be readily thrown through said opening, as is usual, and be received by the hopper, after which said hopper-section is moved into the stationary hopper section for the requisite closing of the same, for firing its contents and incinerating the same, as above noted. The movable or pivoted hopper section is conveniently actuated by the use of a suitably supported rock-shaft 48 equipped with a stirrup 49 for the application of the foot thereto at the front of the seat-box 2, said rock-shaft having a crank-arm at one end to which is connected a horizontal arm 51 fixed to said pivoted hopper-section.

A suitable closure 52 for the opening 3 in the seat-board of the box 2 preferably in the form of a rectangular plate or slide, is suitably supported upon cleats 53 depending from the underside of said seat-board, and is adapted to be actuated with the opening and closing of the closet-door as will now be explained. Having suitable connection with said closure or slide, by brackets or lugs 54 depending therefrom, is a right-angled crank-arm 55, the lower end of which is sleeved loosely as at 56 upon a rock-shaft, such connection with the latter, however, serving only as a convenient means for the support of said crank-arm. To this crank-arm is connected one end of a rod 57 extending along the innerside of the seat-box and having jointed or pivoted thereto a bent lever 58 suitably connected to the door 59 (see Fig. 2) whereby, as the door is closed upon entering the closet, said lever will be so operated that the closure or slide 52 will be removed out of alinement with the seat-opening, while, upon opening the door in vacating the closet, said lever will be so actuated as to return said closure to its initial position and accordingly result in closing said seat-opening for intercepting the escape of odors, as will be readily appreciated.

It will be noted that, as the ashes are delivered or dropped from the inclined board 29 upon the chute 34, by the opening of the grate 30, which latter operation together with the movement of said chute, is effected by drawing upward upon the slack-portion $a'$ of the line $a$ only, said chute will have been so disposed as to discharge the ashes received thereon, upon the shelf 5, or rather upon the excrement deposited upon it; upon releasing said line slack-portion said gate and shelf will automatically return to their initial positions. By now pulling in like manner upon the opposite branch of the line $a$, the closure or part 12 will be moved so as to establish communication with the excrement-pit and simultaneously the "push-off" 10 will effect, as it is carried by the movement of said closure, the pushing of the excrement, with its superposed ash-layer, over into said pit, the parts 12 and 10 automatically returning to their initial positions, upon the release of said line $a$, by the action of the descent of said closure down its incline as shown; the ash-layer covered excrement delivered into said pit being thus sanitarily treated as will be readily appreciated. It will be also noted in this connection that, when it may be desired to remove the initial ash-layer previously deposited upon the shelf or board 5, as above explained, as when it may become by any mishap saturated with the excrement, said shelf, itself, is moved in the direction of the arrow $g$ by suitably actuating the jointed rod or lever connection 6, having suitable outward-extending means adapted to be manually actuated for that purpose, as previously noted. Thus, by this movement of said shelf, said initial ash-layer will be engaged and pushed off said shelf by the plate or "push-off" 10 into the pit below, as is apparent.

A urinal attachment 65 is arranged within the seat-box 2, comprising a vessel or bowl pivoted upon the upper end of a pipe 64 adapted to suitably deliver the contents of said bowl or vessel to the outside, said vessel or bowl standing normally or initially in alinement with, or so as to be accessible through the seat-opening without moving the same, it thus being automatically retained or rather returned to such position when released after the ordinary use of the closet, by a spring 60 suitably connected as shown. In the latter use of the closet, the urinal or vessel 65 is swung out of alinement with the seat-opening by suitably pulling upon a line or cord 61 connected to an arm $i$ outstanding from said vessel, said line passing under a suitably supported pulley 62 and over a likewise suitably supported elevated pulley 63, with its free end depending within convenient grasp of the operator.

By means of the aforesaid combination and arrangement of parts great convenience in the use of this class of closets is secured, in addition to greatly promoting sanitary conditions, as will be readily appreciated.

I claim—

1. An earth closet provided with a shelf arranged in alinement with the seat opening, a scraper, means for operating the scraper and means for moving said shelf in the opposite direction to the movement of the scraper.

2. In an earth closet, the combination with a shelf in alinement with the seat opening, of a receptacle for paper, means for opening the receptacle to allow the insertion of paper therein, a scraper, means for actuating the scraper, and means for moving the shelf in the opposite direction to the movement of the scraper.

3. An earth closet, comprising a shelf in alinement with the seat opening, a receptacle for paper, said receptacle having a hopper, and means for operating the hopper whereby it is moved into alinement with the seat opening.

4. An earth closet, comprising a shelf in alinement with the seat opening, a receptacle for paper, said receptacle having a hopper, and means for operating the hopper whereby it is moved into alinement with the seat opening, said receptacle adapted to be used for the incineration of the paper.

5. An earth closet, comprising a shelf in alinement with the seat opening, a scraper, means for operating said scraper in connection with the shelf, a slide valve for closing the seat opening, and means connecting the valve with the door of the closet, whereby the valve is operated to open the seat opening when the door is fastened.

6. An earth-closet provided with a shelf arranged in alinement with the seat-opening, an ash or material containing receptacle provided with an apertured slide effective for the delivery of the receptacle-contents, and a supplementary tilting receptacle arranged within the aforesaid receptacle, for the delivery of its contents upon said slide and means for actuating said slide and said supplementary receptacle, means for receiving the delivered contents of said receptacles, and means for delivering said contents upon said shelf or board.

7. An earth-closet provided with a urinal attachment comprising a vessel or bowl adapted to normally stand in alinement with the seat-opening, and a delivery pipe for said bowl or vessel, said bowl being pivotally supported upon said delivery pipe.

8. An earth-closet provided with a urinal attachment comprising a bowl or vessel adapted to stand normally in alinement with the seat-opening, and a delivery pipe for said bowl, said bowl being pivoted upon said pipe, means for the movement of said bowl out of alinement with said seat-opening, and means for effecting the automatic return of said bowl to its initial position.

In testimony whereof I affix my signature, in presence of two witnesses.

JOHN R. KOONS

Witnesses:
 WM. GOLSTER,
 R. B. WOLFE.